Aug. 23, 1932.  G. C. SULLIVAN  1,872,845
AEROPLANE
Filed May 29, 1930   2 Sheets-Sheet 1

Inventor
George C. Sullivan
By John D Thomas Co
Attorney

Aug. 23, 1932. G. C. SULLIVAN 1,872,845
AEROPLANE
Filed May 29, 1930 2 Sheets-Sheet 2

Inventor
George C. Sullivan.
By
Attorney

Patented Aug. 23, 1932

1,872,845

UNITED STATES PATENT OFFICE

GEORGE C. SULLIVAN, OF EL PASO, TEXAS

AEROPLANE

Application filed May 29, 1930. Serial No. 457,117.

My invention is an improvement in aeroplanes of the monoplane type, and relates more especially to the construction of the wings by which the aeroplane is sustained in flight.

The primary object of my invention is to provide a construction of aeroplane that will increase safety in flying as well as provide for a manipulation of sections of the wings to make it possible for a high-speed stream-line aeroplane to land gently by changing the angle of air approach of said wing sections causing air resistance or air drag which will overcome the momentum of the weight of the aeroplane, the sections which are turnable with respect to the wings carrying propellers at front and rear thereof to automatically and synchronistically change the propeller pull from a horizontal or forwardly driving direction to a vertical lifting power so as to overcome stalling action as the ship settles in landing at a very low speed, and also assists in rising.

A further object of my invention is to provide an aeroplane with more effective stream lines to lessen air resistance augmented by placing the driving motors in the cabin or cockpit; this location of the motors facilitating the making of any needed repairs heat control of motors regulated by air vents and shutters, as well as making it more convenient for oiling and inspection, the arrangement of the engines and driving shafts to the propellers being such that the air pressure and air suction on the turnable sections will balance engine torque, thus providing for an even balancing of the aeroplane with the weight of the motors centralized.

Other objects and advantages of my improved construction of aeroplane will be apparent from the following description of the construction and operation, and what I particularly claim as new and desire to protect by Letters Patent is more specifically set forth in the appended claims.

In the accompanying drawings illustrating my invention:—

Fig. 3 is a side elevation, the turnable section of the near wing being shown in dotted lines;

Fig. 4 is an enlarged plan view of one of the wings, the inner portion thereof being broken away to show the driving mechanism for the propellers;

Fig. 5 is a side elevation illustrating the mechanism for turning the sections of the wings; and Fig. 6 is a detail view showing a modification of the mechanism for turning the wing sections.

Like numerals of reference indicate like parts in all the figures of the drawings.

Figure 1:
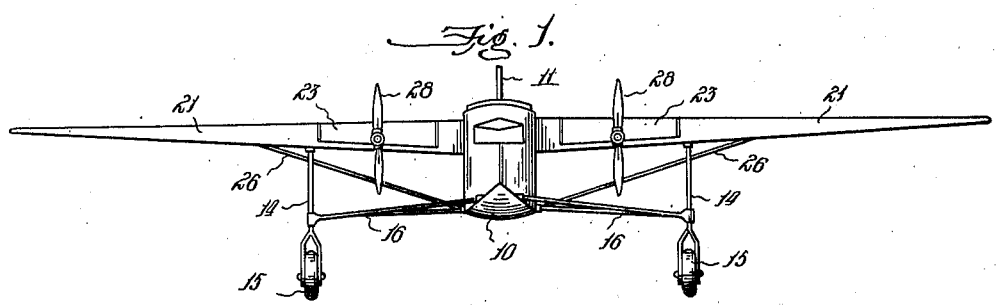
Figure 1 is a front elevation of the aeroplane.
Figure 2:
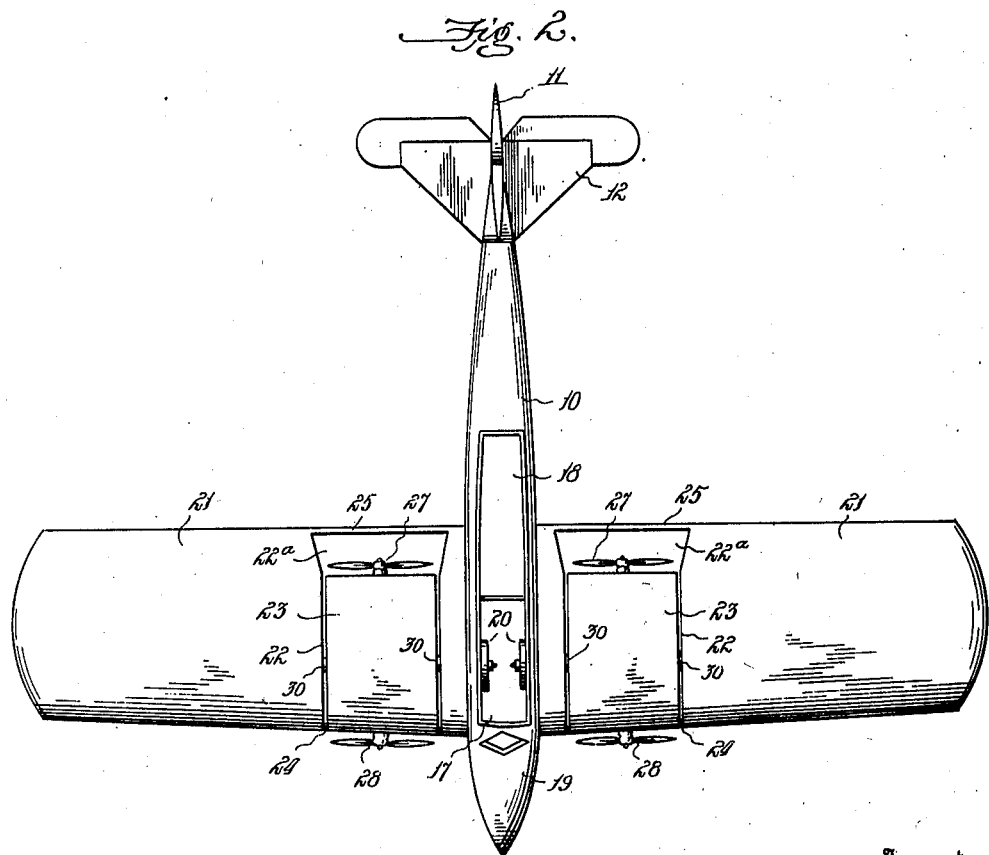
Fig. 2 is a plan view.

In carrying out my invention the body or fuselage 10 of the aeroplane is shaped as shown in the drawings to provide stream lines which will offer the least resistance to the air in flying, said fuselage being provided at its rear end with a rudder 11 and tiltable vanes 12, and for taking off and landing of the aeroplane the under body is provided at the rear end with a roller skid 13 and at the forward end with a truck comprising standards 14 depending from the wings and having wheels 15 at their lower ends, said standards being braced to the body or fuselage by means of stay rods 16, the said body or fuselage having a cockpit 17 with a compartment 18 in the rear for passengers and a compartment 19 in the front or nose of the aeroplane for baggage. In the present instance the motors 20 are located in the cockpit or cabin at the opposite sides thereof on a line parallel with the wings and slightly in advance of the longitudinal center thereof to cooperate with the turnable sections hereinafter described.

In further carrying out my invention the wings 21 21 extending from opposite sides of the fuselage are each cut out at a short distance from the body or fuselage to provide open spaces 22 rectangular in shape to receive correspondingly shaped turnable sections 23, the said spaces or openings being closed at their forward and rear ends by crosspieces 24 and 25 respectively connecting the outer portion of each wing to the inner portion thereof, and the outer portions are further braced to the body by brace rods 26 (Fig. 1). The tubular housing 30 will also act as a brace. The sections 23 are of the same thickness as the wings to form a continuation of the same across the spaces 22 when said turnable sections are in alignment with the wings, or each turnable section may be tapered to a thin rear edge if desired and each section extends from the front edge of the wing to near the rear edge thereof terminating a distance from the crosspiece 25 to leave a space 22a for the operation of a propeller 27 carried by the section at the rear end thereof, a second propeller 28 being located at the front end of said section and both driven by the motors as hereinafter described. It will be understood that the frame work of the wings and turnable sections may be of any approved construction for the use of fabric or metal coverings, and that the crosspiece 24 at the front of the opening in which the turnable section works forms a stop for said section when it is coplanar with the parts of the wing at opposite sides thereof.

The turnable sections are rotatably mounted on shafts 29 29 extending from the motors through said sections and adjoining portions of the wings longitudinally thereof and slightly in advance of the center, said shafts passing through tubular housings 30 journaled in bearings 31 on the wing portions and are suitably geared to the propeller shafts 32 to provide pull and push propellers at the front and back of each section running in the same direction or in opposite directions and at different speeds if desired, the gearing which is enclosed in casing 33 not being shown in detail as the usual type of intermeshing beveled gears is employed. The driving shafts 29 may be connected within the cockpit if desired, and of course the operation of the motors and said driving shafts will control the direction of the pull of the propellers to change the angle of attack of the turnable sections which may be aided by the varying speed of the propellers.

For turning the sections 23 at the desired angle in the operation of the aeroplane under varying conditions links 34 and 35 are connected to the turnable section and adjoining portion of the wing by pivots 36 and 37 respectively and to each other by a toggle joint 38 connecting said links to a rod 39 extending from an arm 40 at the outer end of a shaft 41, the latter extending through the inner portion of the wing into the cabin for operation by means of a lever 42. By reference to Fig. 5 it will be seen that when the operating lever is thrust forward the toggle links will be extended to the position indicated in dotted lines to turn the section 23 on its fulcrum whereby the pulling power of the propellers may be changed at the will of the pilot. The wings may or may not be provided with the usual ailerons 43 as shown in Fig. 4 of the drawings.

Instead of turning the sections 23 of the wings by means of a lever as shown in Fig. 5 the operation may be effected by turning a hand wheel 44 is shown in Fig. 6, in this latter instance each shaft 41 extending into the cockpit being provided with a toothed segment 45 in mesh with a pinion 46 on a stub shaft 47 suitably mounted and to which the hand wheel is fixed, it being noted that each turnable section is provided with separate mechanism for manipulating the same, and obviously other modifications or changes may be made in the construction and arrangement of parts constituting the important features of my invention within the spirit and scope of the claims.

The driving propellers of the aeroplane are carried by the turnable sections and consequently when the aeroplane is being driven forward said sections are brought on a line with the stationary portions of the wings to cooperate therewith in offering the required resistance to the air in sustaining flight, and when it is desired to lift the aeroplane in taking off or retard its descent in alighting the turnable sections of the wing are tilted to a more or less extent whereby the propellers operate as a lifting power in landing or leaving the ground and cause air resistance or air drag to overcome the momentum of the weight of the aeroplane in alighting. The turnable sections are also serviceable in preventing tail-spins, side-slips, or nose-dives by changing the direction of the pull of the propellers, so as to right the ship with engine power in flying position independently of the use of ailerons, although the latter may be also employed as hereinbefore stated. The provision of the turnable sections in connection with the propellers carried at the front and rear thereof will also prevent stalling conditions by having a pushing propeller that will draw the burble point past the rear part of the wing thereby creating more lift, and by tilting the turnable sections independently of each other power banking can be accomplished by changing the direction of the pull of the propellers which automatically changes the angle of attack of said sections and propellers carried thereby.

I claim:

1. In an aeroplane of the construction embodying wings extending outwardly from the body or fuselage, of turnable wing sections forming an intermediate part of the wings normally on the same horizontal plane therewith, propellers mounted on said wing sections and movable therewith for exerting a pulling and lifting force according to the position of said sections, motors located in the fuselage, and transmission gear between the motors and aforesaid propellers.

2. In an aeroplane of the construction embodying wings extending outwardly from the body or fuselage, of turnable wing sections forming an intermediate part of the wings normally on the same horizontal plane therewith and fulcrumed slightly in advance of the center thereof and also in advance of the longitudinal center of the wings, propellers mounted on said sections for exerting a pulling and lifting force according to the position of the sections, motors located in the fuselage, driving shafts from the motors in axial alignment with the fulcrum of the turnable sections, and transmission gear between said driving shafts and propellers.

3. In an aeroplane of the construction embodying wings extending outwardly from the body or fuselage, of turnable wing sections, forming an intermediate part of the wings normally on the same horizontal plane therewith and fulcrumed between the adjoining portions of the wings, propellers mounted at the front and rear ends of said sections for exerting a pulling and lifting force according to the position of the sections, motors located in the fuselage with the driving shaft in axial alignment with the fulcrum of the turnable sections, shafts on which the propellers are mounted extending inwardly from said propellers, and transmission gear between the driving and propeller shafts.

4. An aeroplane comprising a body or fuselage wth wings extending outwardly therefrom and provided with openings through the same, turnable wing sections mounted within said openings and fulcrumed on the adjoining stationary portions of the wings so as to be normally on the same horizontal plane therewith, propellers mounted at the front and rear ends of the turnable sections and movable therewith, motors for driving the propellers mounted within the body or fuselage, and transmission gear between the motors and propellers including a driving shaft extending from the fuselage through the inner portion of each wing and fulcrum of the turnable section.

5. An aeroplane comprising a body or fuselage with wings extending outwardly therefrom and provided with openings through the same, turnable sections mounted within said openings and fulcrumed on the adjoining portions of the wings, propellers mounted at the front and rear ends of the turnable sections, motors for driving the propellers mounted within the body or fuselage, and transmission gear between the motors and propellers including a driving shaft extending from the fuselage through the inner portion of the wing on a line with the fulcrum of the turnable sections; together with means for turning the wing sections from within the fuselage.

6. An aeroplane comprising a body or fuselage with wings extending outwardly therefrom and provided with openings through the same, turnable wing sections within said openings, tubular housings connecting said sections rotatably to the adjoining portions of the wings, propellers mounted at the front and rear ends of the turnable sections, motors for driving the propellers located within the fuselage, and transmission gear between the motors and propellers including a driving shaft extending from the fuselage through the inner portion of the wing and through the aforesaid tubular housings.

7. An aeroplane comprising a body or fuselage with wings extending outwardly therefrom and provided with openings through the same, turnable wing sections within said openings, tubular housings connecting said sections rotatably to the adjoining portions of the wings, propellers mounted at the front and rear ends of the turnable sections, motors for driving the propellers located within the fuselage, and transmission gear between the motors and propellers including a driving shaft extending from the fuselage through the inner portion of the wing and through the aforesaid tubular housings; together with means for turning the wing sections from within the fuselage.

8. An aeroplane comprising a body or fuselage having wings extending outwardly therefrom provided with openings through the same, crosspieces at the front and rear ends of said openings connecting the inner and outer portions of the wings, turnable wing sections mounted in the openings with the outer end of each normally resting on the front crossbar in coplanar relation to the other portions of the wing, propellers mounted at the front and rear ends of the wing sections, motors located in the fuselage for driving the propellers, and transmission gear from the motors to the propellers including shafts extending from the fuselage through the axis of the turnable sections; together with means for manipulating the turnable sections from within the fuselage.

9. An aeroplane comprising a body or fuselage having wings extending outwardly therefrom provided with openings through the same, crosspieces at the front and rear ends of said openings connecting the inner and outer portions of the wings, turnable wing sections mounted in the openings with the outer end of each section normally resting on the front crossbar in coplanar relation to the other portions of the wing and the inner end terminating to leave a space between the wing section and rear crossbar, propellers mounted at the front and rear ends of the wing sections, the propeller at the forward end being beyond the forward edge of the wing and the propeller at the rear end being located between the wing section and rear crossbar connecting the inner and outer portions of the wing, motors located within the fuselage, and transmission gear between the motors and propellers including a shaft on an axial line with the fulcrum of the turnable section.

10. An aeroplane comprising a body or fuselage having wings extending outwardly therefrom provided with openings through the same, crosspieces at the front and rear ends of said openings connecting the inner and outer portions of the wings, turnable wing sections mounted in the openings with the outer end of each section normally resting on the front crossbar in coplanar relation to the other portions of the wing, propellers mounted at the front and rear ends of the wing sections, motors located in the fuselage for driving the propellers, and transmission gear from the motors to the propellers including shafts extending from the fuselage through the axes of the turnable sections; together with means for turning the wing sections comprising a pair of links pivotally connected to the wing section and adjoining portion of the wing and to each other by a toggle joint, a rod connected to the toggle joint, a shaft extending from the fuselage and having an arm connected to said rod, and means for operating said shaft.

GEORGE C. SULLIVAN.